United States Patent [19]
Ohtani

[11] Patent Number: 5,412,993
[45] Date of Patent: May 9, 1995

[54] PRESSURE DETECTION GAGE FOR SEMICONDUCTOR PRESSURE SENSOR
[75] Inventor: Keizo Ohtani, Kanagawa, Japan
[73] Assignee: Yamatake-Honeywell Co., Ltd., Tokyo, Japan
[21] Appl. No.: 177,112
[22] Filed: Jan. 3, 1994
[30] Foreign Application Priority Data
Jan. 14, 1993 [JP] Japan .................. 5-020856
[51] Int. Cl.$^6$ .............................................. G01L 7/00
[52] U.S. Cl. ......................................... 73/727; 73/754
[58] Field of Search .................. 73/721, 727, 754, 726
[56] References Cited
U.S. PATENT DOCUMENTS

| 3,513,430 | 5/1970 | Heller | 73/754 |
| 4,672,354 | 6/1987 | Kurtz et al. | 73/721 |
| 5,165,283 | 11/1992 | Kurtz et al. | 73/724 |
| 5,231,301 | 7/1993 | Peterson et al. | 73/727 |
| 5,291,788 | 3/1994 | Oohata et al. | 73/726 |
| 5,303,544 | 4/1994 | Kurtz et al. | 73/721 |

Primary Examiner—Herbert Goldstein
Assistant Examiner—R. L. Biegel
Attorney, Agent, or Firm—Lane, Aitken & McCann

[57] ABSTRACT

A pressure detection gage for a semiconductor pressure sensor includes a gage portion, a pair of lead out portions, and an isolation layer. The gage portion is formed on the upper surface of a semiconductor substrate of the first conductivity type, has a predetermined sheet resistance, and serves as a piezoelectric region. The pair of lead out portions are formed as heavily doped semiconductor regions of the second conductivity type on the surface of the semiconductor substrate and are electrically connected to two ends of the gage portion. The isolation layer is formed from a lightly doped semiconductor region of the second conductivity type formed in the semiconductor substrate to surround the lead out portions.

13 Claims, 3 Drawing Sheets

PRESSURE DETECTION GAGE FOR SEMICONDUCTOR PRESSURE SENSOR

BACKGROUND OF THE INVENTION

The present invention relates to the structure of a pressure detection gage for a semiconductor pressure sensor for detecting a pressure difference or a pressure.

As a conventional semiconductor pressure sensor of this type, a sensor using an Si (silicon) semiconductor diaphragm is known. This Si diaphragm type semiconductor pressure sensor is formed as follows. A gage serving as a piezoelectric region is formed on the upper surface of a semiconductor substrate by diffusion of an impurity or ion implantation. In addition, leads are formed by vapor deposition of Al or the like. Part of the lower surface of the substrate is then etched to form a distortion portion having a thickness of about 20 $\mu$m to 50 $\mu$m, i.e., a diaphragm. In the pressure sensor formed in this manner, when measurement pressures are respectively applied to the upper and lower surfaces of the diaphragm, the resistivity of the gage changes upon deformation of the diaphragm. By detecting an output voltage accompanying this change in resistivity, a pressure difference or a pressure is measured. The piezoelectric resistance coefficients decrease with an increase in amount of an impurity doped into the semiconductor substrate regardless of whether the impurity is of p type or n type. For this reason, in order to increase the rate of change in resistivity of the gage to improve sensitivity with respect to pressure, the concentration of an impurity is set to be low. In addition, the piezoelectric resistance coefficients change depending on whether a p-type or n-type impurity is used. The piezoelectric resistance coefficients are larger when a p-type impurity is used than when an n-type impurity is used. For this reason, a p-type resistive layer is generally formed on an n-type semiconductor.

FIG. 6 shows a gage in a conventional semiconductor pressure sensor. FIG. 7 shows a cross-section of the gage along a line VII—VII in FIG. 6. Referring to FIGS. 6 and 7, reference numeral 1 denotes an n-type semiconductor substrate consisting of an Si single crystal; and 2, a p-type folded gage formed on the upper surface of the semiconductor substrate 1 and serving as a piezoelectric resistive region. This folded gage 2 is constituted by a pair of gage portions 2a and 2b formed parallel to each other and having a predetermined sheet resistance and a low impurity concentration ($10^{19}$/cm$^3$), a coupling portion 3 coupling one end of the gate portion 2a to that of the gate portion 2b, and a pair of lead out portions 4a and 4b to which the other end of the gage portion 2a and that of the gage portion 2b are respectively connected. In general, the coupling portion 3 and the lead out portions 4a and 4b are formed from a p+-type semiconductor region having a high impurity concentration ($10^{21}$/cm$^3$) in order to eliminate the influences of these components on the gage portions 2a and 2b. Reference numerals 5a and 5b denote aluminum leads formed by vapor deposition. End portions of these leads 5a and 5b are respectively connected to the lead out portions 4a and 4b.

When a reverse voltage is applied to a p-n junction, a saturation current Is flows only slightly. When, however, the reverse voltage exceeds a predetermined voltage, a large current flows abruptly. This phenomenon is called breakdown, and this predetermined voltage is called a breakdown voltage VB. If a voltage exceeding the breakdown voltage VB is applied to a p-n junction, the p-n junction mechanically breaks down for the following reason. As the reverse voltage applied to the p-n junction becomes higher, the electric field becomes stronger to increase the energies of electrons and holes. When such electrons collide with other electrons, the valence electron bonds are destroyed to abruptly cause electron avalanche. Therefore, the breakdown voltage VB is preferably set to be high. However, since the coupling portion 3 and the lead out portions 4a and 4b are formed from a heavily doped p+-type semiconductor region having a low resistance, the depletion layer width is small, resulting in a strong electric field. For this reason, in the coupling portion 3 and the lead out portions 4a and 4b, the reverse withstand voltage of the p-n junction is low, and the breakdown voltage VB is low.

SUMMARY OF THE INVENTION

It is an object of the present invention to provide a pressure detection gate for a semiconductor pressure sensor, which can increase a breakdown voltage VB at a conducting portion.

In order to achieve the above object, according to the present invention, there is provided a pressure detection gage for a semiconductor pressure sensor, comprising a gage portion formed on a surface of a semiconductor substrate of a first conductivity type, having a predetermined sheet resistance, and serving as a piezoelectric region, a pair of lead out portions formed as heavily doped semiconductor regions of a second conductivity type on the surface of the semiconductor substrate and electrically connected to two ends of the gage portion, and an isolation layer formed from a lightly doped semiconductor region of the second conductivity type formed in the semiconductor substrate to surround the lead out portions.

DESCRIPTION OF THE PREFERRED EMBODIMENT

An embodiment of the present invention will be described in detail below with reference to the accompanying drawings.

Figure 1:
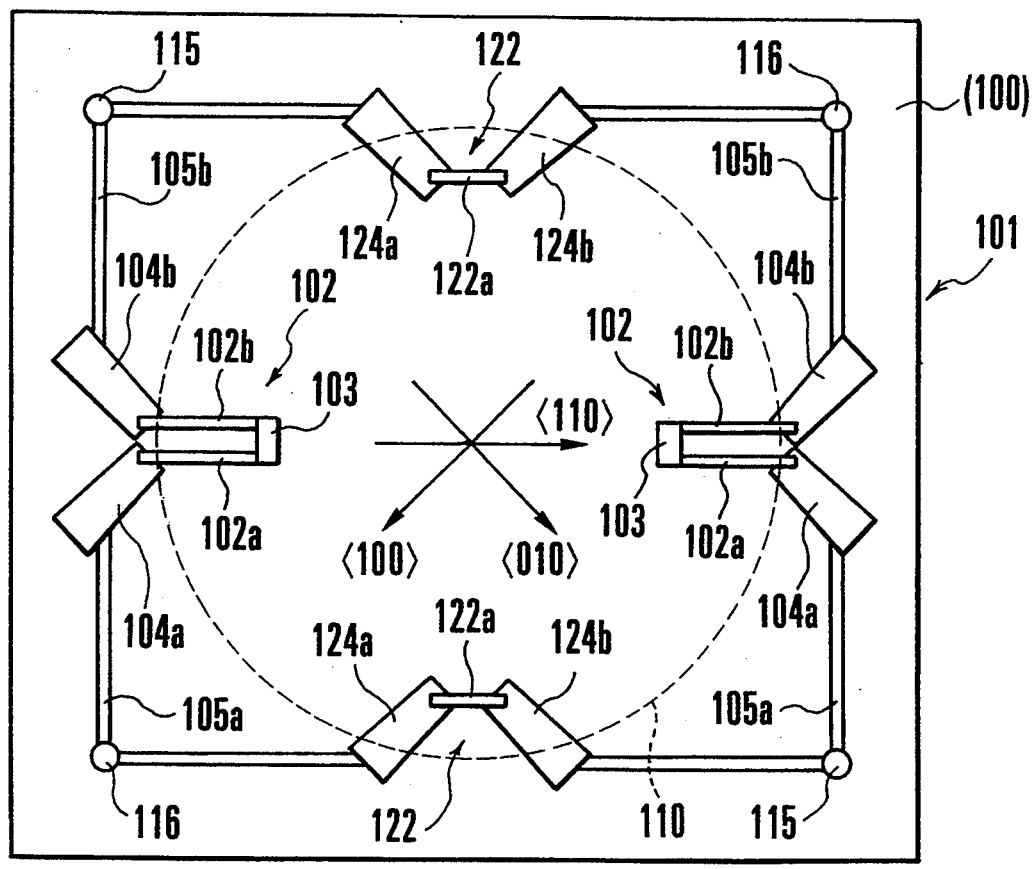
FIG. 1 is a plan view of a semiconductor pressure sensor according to an embodiment of the present invention.
Figure 2:
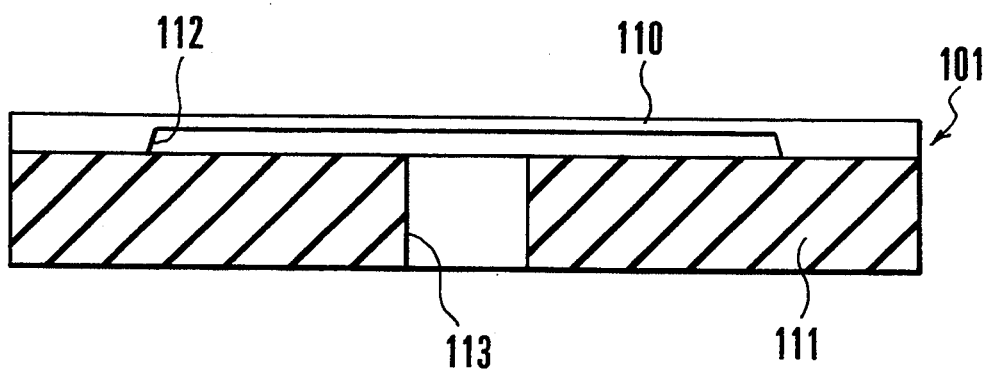
FIG. 2 is a sectional view of the semiconductor pressure sensor according to the embodiment of the present invention.
Figure 3:
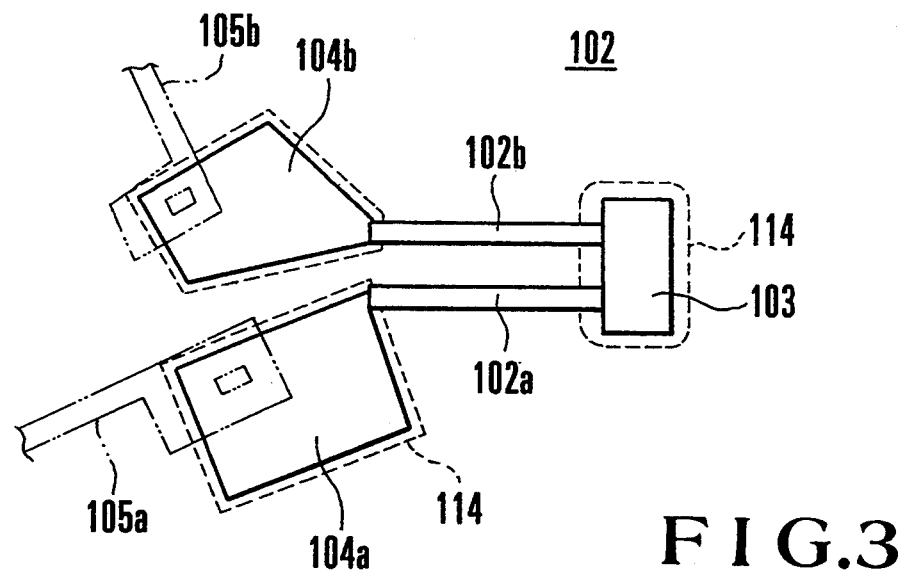
FIG. 3 is a plan view of a folded gage in FIG. 1.
Figure 4:
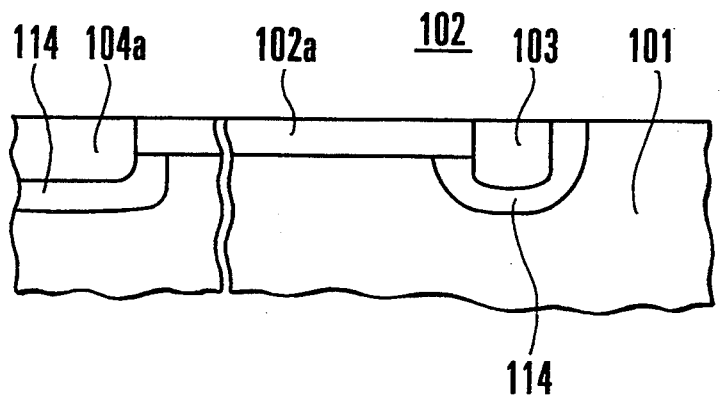
FIG. 4 is a sectional view of a main part of the folded gage in FIG. 1.

FIGS. 1 and 2 show a semiconductor pressure sensor according to an embodiment of the present invention. FIG. 3 shows a folded gage. FIG. 4 shows a main part of the gage. Referring to FIGS. 1 and 2, a semiconductor substrate 101 of the first conductivity type consists of an n-type single crystal Si having a (100) plane. A central portion of the lower surface of the semiconductor substrate 101 is removed by etching to form a pressure-sensitive diaphragm portion 110 in the form of a thin disk. The diaphragm portion 110 is sensitive to a pressure difference or a pressure. Pressure difference detection gages 102 and 122 serving as piezoelectric resistive regions are formed on the upper surface of the diaphragm portion 110. The pressure difference detection gages 102 and 122 serve to detect a pressure difference or a pressure. The diaphragm portion 110 is integrally joined onto a back plate 111 by electrostatic coupling. The back plate 111 consists of pyrex, a ceramic material, or the like which has almost the same thermal expansion coefficient as that of the semiconductor substrate 101. A through hole 113 is formed in the center of the back plate 111 to guide part of a pressure to be measured to the lower surface side of the diaphragm portion 110 via a recess portion 112 formed in the lower surface of the semiconductor substrate 101. Reference numeral 115 denotes a pressure difference signal extraction terminal portion; and 116, a pressure difference detection power supply terminal portion. These terminal portions 115 and 116 are respectively connected to the pressure difference detection gages 102 and 122 via leads 105a and 105b.

Two pairs of pressure difference detection gages 102 and 122 are alternately formed at equal angular intervals on the upper surface of the diaphragm portion 110 by diffusion or ion implantation at positions near the outer periphery of the diaphragm portion 110 at which stresses generated in the radial and circumferential directions upon application of a pressure difference or a pressure become maximum. The four pressure difference detection gages 102 and 122 are connected to a Wheatstone bridge to differentially output pressure difference signals. As shown in FIG. 3, the pressure difference detection gage 102 is constituted by a folded gage comprising a pair of elongated gage portions 102a and 102b, a coupling portion 103, and a pair of lead out portions 104a and 104b. Each of the gage portions 102a and 102b has a low impurity concentration ($10^{19}/cm^3$) and a predetermined sheet resistance. The gage portions 102a and 102b are parallel to a <110> crystallographic direction, in which the piezoelectric resistance coefficients are maximized, within a (100) plane. The coupling portion 103 is constituted by a semiconductor region of the second conductivity type (p+ type) having a high impurity concentration ($10^{21}/cm^3$) and serves to couple one end of the gage portion 102a to that of the gage portion 102b. The lead out portions 104a and 104b are respectively connected to the other end of the gage portion 102a and that of the gage portion 102b. As shown in FIG. 4, the pressure difference detection gage 102 includes an isolation layer 114 constituted by a semiconductor region of the second conductivity type (p− type) formed in the semiconductor substrate 101 to surround the coupling portion 103 and lead out portions 104a and 104b to isolate them. This semiconductor region has a low impurity concentration ($10^{19}/cm^3$).

The pressure difference detection gage 122 is constituted by an elongated gage portion 122a and lead out portions 124a and 124b. The gage portion 122a has a low impurity concentration and a predetermined sheet resistance. The gage portion 122a is parallel to a <100> crystallographic direction, in which the piezoelectric resistance coefficients are maximized, within the (100) plane. The lead out portions 124a and 124b are respectively connected to the two ends of the gage portion 122a. Each of the lead out portions 104a, 104b, 124a, and 124b of the pressure difference detection gages 102 and 122 is formed at a leading angle of 45° with respect to the longitudinal direction of each of the gage portions 102a, 102b, and 122 so as to cancel the stress induced by deformation upon a temperature change of these portions and to prevent the adverse influence of such stress on the detection precision.

In manufacturing the coupling portion 103, the lead out portions 104a and 104b, and the isolation layer 114, an impurity such as boron is doped into the semiconductor substrate 101 at a low concentration by diffusion or ion implantation to form the isolation layer 114 consisting of a lightly doped semiconductor region of the second conductivity type. Thereafter, the same impurity is doped, at a high concentration, into predetermined portions of the semiconductor region 114 of the second conductivity type, which constitutes the isolation layer 114, to form the coupling portion 103 and the pair of lead out portions 104a and 104b, which are formed from a heavily doped semiconductor region of the second conductivity type, in a non-contact state with respect to the semiconductor substrate 101.

Figure 5:
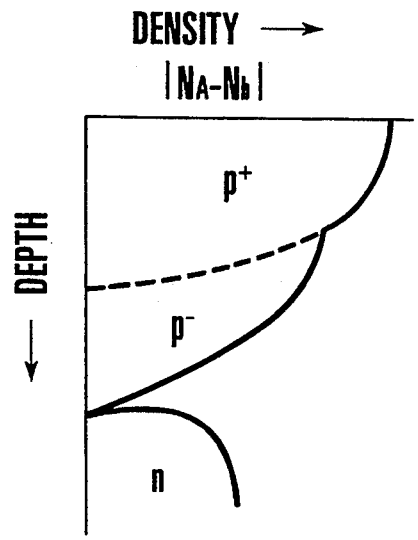
FIG. 5 is a graph showing the relationship between the impurity concentration and the depth in cases wherein impurities are doped at a low concentration and at a high concentration.
Figure 6:
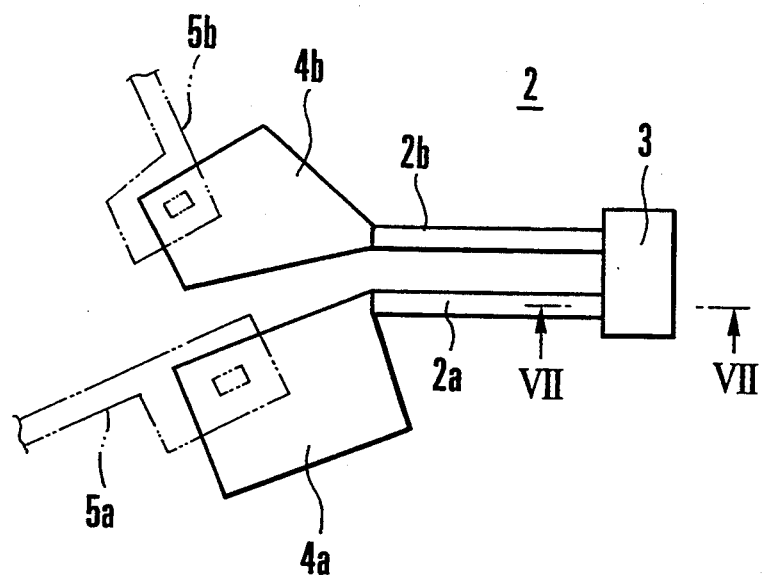
FIG. 6 is a plan view of a gage in a conventional semiconductor pressure sensor.
Figure 7:
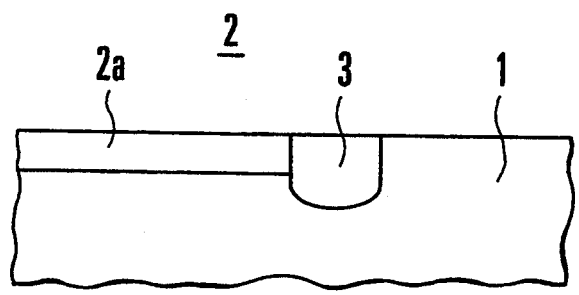
FIG. 7 is a sectional view taken along a line VII—VII in FIG. 6.

FIG. 5 is a graph showing the relationship between the impurity concentration and the depth in cases wherein impurities are doped at a low concentration and at a high concentration. The lightly doped semiconductor region of the second conductivity type (p− type) is formed deeper than the heavily doped semiconductor region (p+ type) having a high impurity concentration.

In the semiconductor pressure sensor having the above-described arrangement, as shown in FIGS. 3 and 4, the coupling portion 103 and the lead out portions 104a and 104b of the pressure difference detection gage 102 are surrounded by the isolation layer constituted by the lightly doped semiconductor region of the second conductivity type formed in the semiconductor substrate 101 to isolate the portions 103, 104a, and 104b from the semiconductor substrate 101. With this structure, a thick depletion layer is formed, and the electric field is weakened. As a result, the reverse withstand voltage of the p-n junction increases, and the breakdown voltage VB of the gage 102 can be increased. In this case, since a current flowing between the gage portions 102a and 102b passes through the coupling portion 103 and the lead out portions 104a and 104b which constitute a low-resistance layer, the formation of the isolation layer 114 surrounding the coupling portion 103 and the lead out portions 104a and 104b has no influence on the resistance.

In the above-described embodiment, the isolation layer 114 is formed to surround both the coupling portion 103 and the lead out portions 104a and 104b. However, the present invention is not limited to this structure, and the isolation layer 114 may be formed to surround at least one of these portions. For example, this structure may be applied to a pressure difference detection gage 122 having one elongated gage portion 122a which is not folded, and an isolation layer 114 may be formed to surround only lead out portions 124a and 124b.

In the above embodiment, the semiconductor substrate 101 consists of n-type silicon, and the pressure difference detection gage 102 as a piezoelectric region consists of p-type silicon. However, the present invention is not limited to this. The reason why the piezoelectric resistive element consisting of p-type silicon is that a p-type element has better pressure-resistance linearity than an n-type element, and forward and reverse outputs with good symmetry can be extracted in the <110> crystallographic direction, in which the piezoelectric resistance coefficients are maximized, within the (100) plane. It is, however, apparent that, for example, an n-type piezoelectric resistive region can be formed on a p-type region.

As has been described above, according to the pressure difference detection gage of the present invention for the semiconductor pressure sensor, the depletion layer in the lightly doped conductive semiconductor region is thicker than that formed by the coupling portion or the lead out portions. As a result, the electric field is weakened. For this reason, the withstand voltage can be increased, and the breakdown voltage VB of the pressure difference detection gage can be increased. In addition, since a current flowing between the gage portions passes through the coupling portion and the lead out portions, which constitute the low-resistance layer, the formation of the lightly doped conductive semiconductor region surrounding conducting portions such as the coupling portion and the lead out portions has no influence on the resistance, thus allowing accurate detection of a pressure difference or a pressure.

What is claimed is:

1. A pressure detection gage for a semiconductor pressure sensor, comprising:
    a semiconductor substrate of a first conductive type;
    a gage portion formed on a surface of said semiconductor substrate, said gage portion serving as a piezoelectric resistance region with a predetermined sheet resistance;
    a pair of lead out portions electrically connected to two ends of said gage portion, respectively, said pair of lead out portions comprising heavily doped semiconductor regions of a second conductivity type formed on or within said semiconductor substrate; and
    a first isolation layer disposed between said semiconductor substrate and pair of lead out portions from said semiconductor substrate, said first isolation layer comprising a lightly doped semiconductor region of the second conductivity type formed in said semiconductor substrate.

2. A gage according to claim 1, wherein said semiconductor substrate comprises a p-type semiconductor, and said lead out portions comprise an n-type semiconductor region.

3. A gage according to claim 1, wherein said gage portion is formed in an elongated fashion and positioned so as to be substantially parallel to a crystallographic direction of a semiconductor substrate material in which a piezoelectric resistance coefficient is maximized.

4. A gage according to claim 1, wherein said gage portion is constituted by a pair of elongated gages arranged parallel to each other, each of said gages having one end connected to a corresponding one of said pair of lead out portions, and further comprises a coupling portion, formed as a heavily doped semiconductor region of the second conductivity type on the surface of said semiconductor substrate, for electrically connecting the other end of the one elongated gage to the other end of the other elongated gage.

5. A gage according to claim 4, wherein said semiconductor substrate comprises a p-type semiconductor, and said coupling portion comprises an n-type semiconductor region.

6. A gage according to claim 4, further comprising a second isolation layer disposed between said semiconductor substrate and said coupling portion to isolate said coupling portion from said semiconductor substrate.

7. A gage according to claim 4, further comprising a second isolation layer disposed between said semiconductor substrate and said coupling portion to isolate said coupling portion from said semiconductor substrate, said second isolation layer comprising a lightly doped semiconductor region of the second conductivity type formed within said semiconductor substrate.

8. A gage according to claim 1, wherein said pair of lead out portions are formed at a leading angle of 45° with respect to the arrangement direction of said gage portion.

9. A gage according to claim 1, wherein said semiconductor substrate comprises an n-type semiconductor, and said pair of lead outs portions comprise a p-type semiconductor region.

10. A gage according to claim 1, wherein said semiconductor substrate comprises an n-type semiconductor and said gage portion comprises a p-type semiconductor region.

11. A gage according to claim 4, wherein said semiconductor substrate comprises an n-type semiconductor, and said coupling portions and pair of lead out portions comprise p-type semiconductor regions.

12. A gage according to claim 4, wherein said isolation layer comprises a region having a low concentration of a doping impurity and said lead out portions and said coupling portions are comprised of a material with a high concentration of the same said doping impurity.

13. A gage according to claim 4, wherein said semiconductor substrate comprises a p-type semiconductor, and said coupling portion and said lead out portions comprise n-type semiconductor regions.

* * * * *